(12) United States Patent 
Yamaguchi

(10) Patent No.: US 12,591,333 B2 
(45) Date of Patent: Mar. 31, 2026

(54) SIGNAL PROCESSING CIRCUIT

(71) Applicant: Murata Manufacturing Co., Ltd., Nagaokakyo (JP)

(72) Inventor: Yoshihiro Yamaguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/953,724

(22) Filed: Nov. 20, 2024

(65) Prior Publication Data

US 2025/0077019 A1 Mar. 6, 2025

Related U.S. Application Data

(63) Continuation of application No. PCT/JP2023/019691, filed on May 26, 2023.

(30) Foreign Application Priority Data

Jun. 7, 2022 (JP) ................................. 2022-092205

(51) Int. Cl.
| | |
|---|---|
| G06F 3/041 | (2006.01) |
| G01B 7/00 | (2006.01) |
| G01L 1/16 | (2006.01) |

(52) U.S. Cl.
CPC ........ G06F 3/04164 (2019.05); G06F 3/0414 (2013.01); *G01B 7/00* (2013.01); *G01L 1/16* (2013.01); *G06F 3/04182* (2019.05)

(58) Field of Classification Search
CPC . G01L 1/16; G01B 7/00; G06F 3/0414; G06F 3/04182; G06F 3/04164

USPC .......................................................... 345/156 
See application file for complete search history.

(56) References Cited

U.S. PATENT DOCUMENTS

| | | | |
|---|---|---|---|
| 5,736,896 A | 4/1998 | Sakishita et al. | |
| 11,009,410 B2 | 5/2021 | Isono et al. | |
| 11,079,878 B1 * | 8/2021 | Krah ........................ | H03H 7/06 |

(Continued)

FOREIGN PATENT DOCUMENTS

| | | |
|---|---|---|
| JP | S63-275917 A | 11/1988 |
| JP | H08-121234 A | 5/1996 |
| JP | S63-242016 A | 10/1998 |

(Continued)

OTHER PUBLICATIONS

International Search Report received for PCT Patent Application No. PCT/JP2023/019691, mailed on Aug. 15, 2023, 2 pages (English Translation only).

*Primary Examiner* — Jimmy H Nguyen 
(74) *Attorney, Agent, or Firm* — ArentFox Schiff LLP

(57) ABSTRACT

A signal processing circuit is provided that includes a capacitor coupled to a signal line to be coupled to a sensor, and coupled in series with the sensor, and a variable resistance circuit coupled in parallel with the capacitor. The variable resistance circuit and the capacitor form a high-pass filter that allows a signal having a cutoff frequency or higher to pass through the high-pass filter. In the variable resistance circuit, a resistance value is set to a first resistance value when a target signal having a peak component on a time axis is allowed to pass through the high-pass filter, and the cutoff frequency at the first resistance value is $\frac{1}{10}$ or less of a frequency of the peak component.

18 Claims, 6 Drawing Sheets

(56)         References Cited

U.S. PATENT DOCUMENTS

2020/0033204  A1      1/2020   Isono et al.

FOREIGN PATENT DOCUMENTS

| | | | |
|---|---|---|---|
| JP | 2004-085351 | A | 3/2004 |
| JP | 2015-001510 | A | 1/2015 |
| WO | 2019/069786 | A1 | 4/2019 |

* cited by examiner

SIGNAL PROCESSING CIRCUIT

CROSS REFERENCE TO RELATED APPLICATIONS

This application is a continuation of International Application No. PCT/JP2023/019691, filed May 26, 2023, which claims priority to Japanese Patent Application No. 2022-092205, filed Jun. 7, 2022, the entire contents of each of which are hereby incorporated by reference in their entireties.

TECHNICAL FIELD

The present disclosure relates to a signal processing circuit that processes a signal output from a sensor.

BACKGROUND

International Publication No. WO 2019/069786 (the "'768 Publication") describes a pressing sensor that includes a piezoelectric element, a circuit, and a receiving unit. In operation, the receiving unit is displaced in shape due to a press operation by a user. The piezoelectric element is attached to the receiving unit and is displaced in shape, following displacement in shape of the receiving unit. The piezoelectric element outputs a charge corresponding to an amount of displacement in shape of the piezoelectric element. The circuit converts a charge generated from the piezoelectric element into a voltage. When detecting a voltage equal to or higher than a preset threshold value, the circuit determines that the receiving unit is press-operated.

In operation, the piezoelectric element of the '768 Publication generates a positive charge when displaced in shape by a press operation. The piezoelectric element is an elastic material. Therefore, after a positive charge is generated, a negative charge having the reverse polarity is generated by a restitutive action. The circuit changes the magnitude of the threshold value in order to prevent the voltage having the reverse polarity due to a restitutive action of a press operation from being erroneously detected as a press operation.

The configuration disclosed in the '768 Publication cannot handle when the restitutive action further increases. In addition, the factor contributing to generation of the component having the reverse polarity is not limited to the restitutive action disclosed in the '768 Publication. For example, as described below, when the circuit has a high-pass characteristic, a reverse polarity component may be generated. FIG. 1A is a diagram illustrating a time domain waveform (e.g., a voltage waveform) of an input signal after passing through a high-pass filter. FIG. 1B is a diagram illustrating a time domain waveform (e.g., a voltage waveform) of an input signal before passing through a high-pass filter.

When the input signal passes through the high-pass filter, the low-frequency component of the input signal is removed. Therefore, the high-pass filter collapses the time domain waveform of the input signal. For example, as illustrated in FIG. 1A, the high-pass filter may output a negative voltage component (a negative voltage from time t1 to time t2 in FIG. 1A) from an input signal having a single waveform and a peak component on a positive time axis. The high-pass filter may also output a positive voltage component (a positive voltage from time t3 to time t4 in FIG. 1A) from an input signal having a single waveform and a negative voltage component. Hereinafter, a negative voltage component generated from the input signal of the positive voltage or a positive voltage component generated from the input signal of the negative voltage is referred to as an overshoot.

SUMMARY OF THE INVENTION

In view of the foregoing, it is an object of the present disclosure to provide a signal processing circuit that is configured to reduce an overshoot.

In an exemplary aspect, a signal processing circuit is provided that includes a capacitor being coupled to a signal line to be coupled to a sensor, the capacitor being coupled in series with the signal line, and a variable resistance circuit being coupled in parallel with the signal line. The variable resistance circuit and the capacitor form a high-pass filter that allows a signal having a cutoff frequency or higher to pass through the high-pass filter. In the variable resistance circuit, a resistance value is set to a first resistance value when a target signal having a peak component on a time axis is allowed to pass through the high-pass filter, and the cutoff frequency at the first resistance value is $\frac{1}{10}$ or less of a frequency of the peak component.

According to the signal processing circuit of the present disclosure, an overshoot can be reduced.

DETAILED DESCRIPTION

First Exemplary Embodiment

Figure 2:
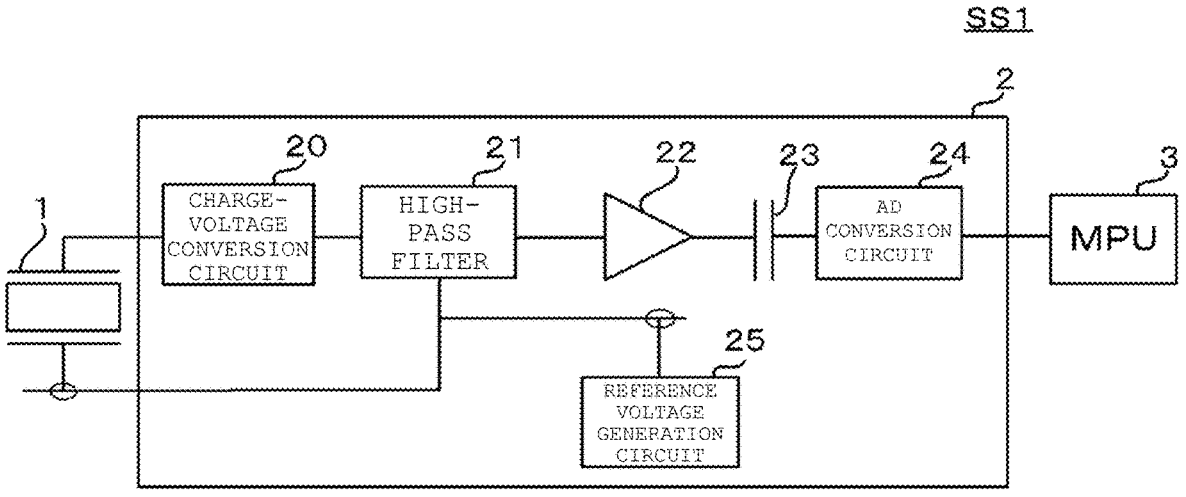
FIG. 2 is a diagram illustrating an example of a circuit configuration of a sensor system SS1.
Figure 3:
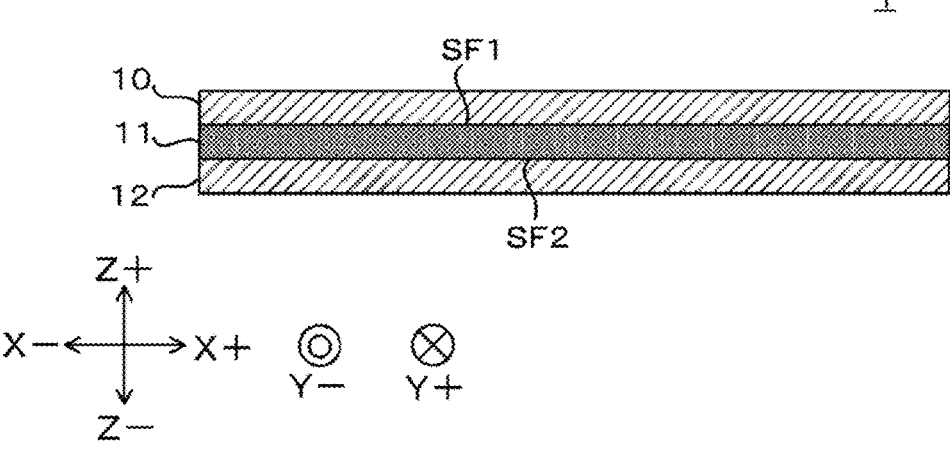
FIG. 3 is a sectional view of a piezoelectric sensor 1.
Figure 4:
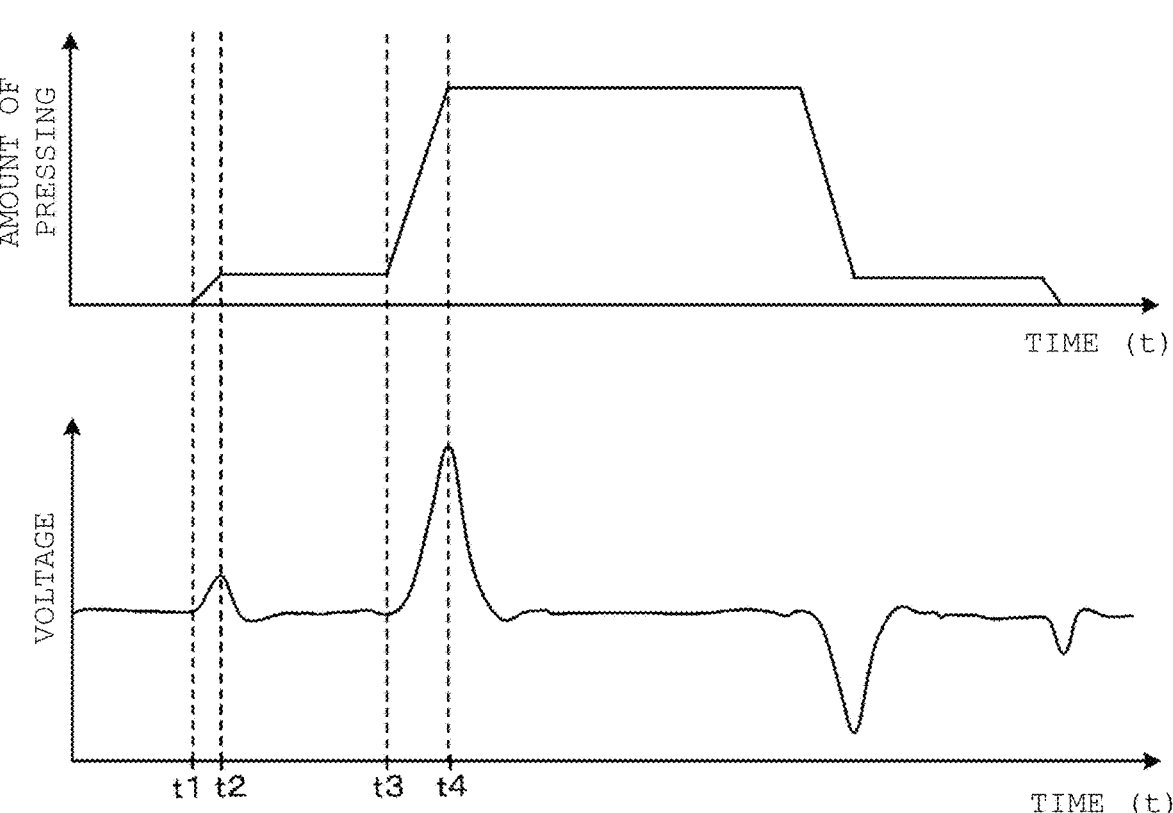
FIG. 4 is a diagram illustrating a relationship between an amount of pressing by a user and a voltage output from a charge-voltage conversion circuit 20.
Figure 5:
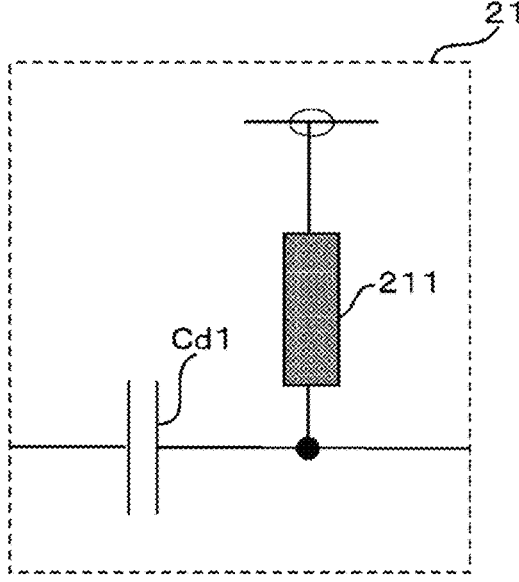
FIG. 5 is a diagram illustrating a circuit configuration of a high-pass filter 21.

Hereinafter, a signal processing circuit 2 according to an exemplary embodiment of the present disclosure will be described with reference to the drawings. FIG. 2 is a diagram illustrating an example of a circuit configuration of a sensor system SS1. FIG. 3 is a sectional view of a piezoelectric sensor 1. FIG. 4 is a diagram illustrating a relationship between an amount of pressing by a user and a voltage output from a charge-voltage conversion circuit 20. FIG. 5 is a diagram illustrating a circuit configuration of a high-pass filter 21.

As illustrated in FIG. 2, the sensor system SS1 includes the piezoelectric sensor 1, the signal processing circuit 2, and a micro processing unit (MPU) 3.

In the present embodiment, the piezoelectric sensor 1 is a pressing sensor that is configured to detect a press operation. The piezoelectric sensor 1 is attached to, for example, a touch panel display of an electronic device, such as a smartphone or the like. The piezoelectric sensor 1 is configured to generate a charge in accordance with a change amount of a pressing force of a user. Specifically, a user press-operates the touch panel display. The touch panel display is displaced in shape in accordance with a pressing force. As a result, the piezoelectric sensor 1 attached to the touch panel display is displaced in shape (e.g., expanded or contracted) in accordance with a pressing force, and generates charges.

As illustrated in FIG. 3, the piezoelectric sensor 1 includes a first electrode 10, a piezoelectric film 11, and a second electrode 12.

Hereinafter, and for purposes of this disclosure, description will be made on the basis of definitions in which, as illustrated in FIG. 3, an up-down direction on the plane of the paper is a Z-axis direction (e.g., a thickness direction of the piezoelectric sensor 1), a left-right direction on the plane of the paper is an X-axis direction, and a direction orthogonal to the Z-axis direction and the X-axis direction is a Y-axis direction.

As illustrated in FIG. 3, the piezoelectric film 11 has a first main surface SF1 and a second main surface SF2 arranged in the Z-axis direction. In the present embodiment, the piezoelectric film 11 is, for example, a film including chiral polymers as a main material. The chiral polymer is, for example, polylactic acid (PLA), particularly poly-L-lactic acid (PLLA) or poly-D-lactic acid (PDLA). In general, it is noted that polylactic acid is a chiral polymer, a main chain of which has a helical structure. Polylactic acid has piezoelectricity by being oriented in a predetermined axial direction. This piezoelectricity is indicated by a piezoelectric tensor d14.

The piezoelectric film 11 is attached to the touch panel display such that the stretching direction forms an angle of about 45° with respect to the X-axis direction and the Y-axis direction. In this way, polarization occurs due to expansion and contraction of the touch panel display in the X-axis direction or the Y-axis direction, and an output is generated at the piezoelectric sensor 1. That is, the piezoelectric film 11 is displaced in shape as the touch panel is displaced in shape (e.g., expanded or contracted), and generates charges.

It is noted that the stretching direction does not necessarily form an accurate angle of 45 degrees with respect to the X-axis direction or the Y-axis direction. For example, the piezoelectric film 11 may be attached to the touch panel display so that the stretching direction forms an angle of about 45±10° with respect to the X-axis direction and the Y-axis direction.

According to an exemplary aspect, the first electrode 10 is a signal electrode. The first electrode 10 is attached to the first main surface SF1 with an adhesive or the like (not illustrated). The first electrode 10 covers the first main surface SF1. The first electrode 10 is, for example, an organic electrode including indium tin oxide (ITO), or zinc oxide (ZnO). Alternatively, the first electrode 10 is, for example, a metal film by vapor deposition or plating, or a printed electrode film by silver paste.

Moreover, in an exemplary aspect, the second electrode 12 is a reference voltage electrode and is coupled to a reference voltage source. The second electrode 12 is attached to the second main surface SF2 with an adhesive or the like (not illustrated). The second electrode 12 covers the second main surface SF2. The second electrode 12 is, for example, an organic electrode including indium tin oxide (ITO), or zinc oxide (ZnO). Alternatively, the second electrode 12 is, for example, a metal film by vapor deposition or plating, or a printed electrode film by silver paste.

As illustrated in FIG. 2, the signal processing circuit 2 is disposed between the piezoelectric sensor 1 and the MPU 3. The signal processing circuit 2 is configured to convert the charge output from the piezoelectric sensor 1 into a voltage signal, and to perform various signal processing on the voltage signal obtained by the conversion. As illustrated in FIG. 2, the signal processing circuit 2 includes the charge-voltage conversion circuit 20, the high-pass filter 21, an amplifier circuit 22, a capacitor 23, an (analog-to-digital ("A/D") conversion circuit 24, and a reference voltage generation circuit 25.

As illustrated in FIG. 2, the charge-voltage conversion circuit 20 is disposed between the piezoelectric sensor 1 and the high-pass filter 21. The charge-voltage conversion circuit 20 is configured to convert the charge detected by the piezoelectric sensor 1 into a voltage. The magnitude and polarity of the charge generated in the piezoelectric film 11 are proportional to the derivative of the amount of pressing. As illustrated in FIG. 4, when a user presses the touch panel display, the polarity of the voltage output from the charge-voltage conversion circuit 20 changes to positive. In operation, when a user stops pressing the touch panel display, the polarity of the voltage output from the charge-voltage conversion circuit 20 changes to negative.

As illustrated in FIG. 2, the high-pass filter 21 is disposed between the charge-voltage conversion circuit 20 and the amplifier circuit 22. As illustrated in FIG. 5, the high-pass filter 21 includes a capacitor Cd1 and a variable resistance circuit 211. The capacitor Cd1 is coupled in series with a signal line. Moreover, the capacitor Cd1 has a capacitance value Cc1. The variable resistance circuit 211 is coupled in parallel with the signal line. The variable resistance circuit 211 has a resistance value Rc. The high-pass filter 21 is configured to allow or pass a signal of a cutoff frequency fc or higher, which is determined by the resistance value Rc of the variable resistance circuit 211 and the capacitance value Cc1 of the capacitor Cd1, therethrough. In an exemplary aspect of the present disclosure, the cutoff frequency fc of the high-pass filter 21 is expressed as "$fc=1/(2\pi \times Rc \times Cc1)$" by the resistance value Rc and the capacitance value Cc1. Therefore, the high-pass filter 21 allows a signal having a frequency of "$1/(2\pi \times Rc \times Cc1)$" or more to pass therethrough.

The high-pass filter 21 is configured to receive a signal having a single waveform or a burst waveform. The signal having a single waveform or burst waveform may include one or more frequency components. In this case, in the present embodiment, the frequency of the temporal peak component in the signal is defined as follows the largest frequency component among one or more frequency components included in the signal subjected to signal processing by the high-pass filter 21.

In an exemplary aspect, the signal subjected to signal processing by the high-pass filter 21 can include a DC component. In this case, the frequency of the temporal peak component in the signal is defined as follows: the largest frequency component among one or more frequency components included in the signal after removal of the DC component from the signal subjected to signal processing by the high-pass filter 21.

As illustrated in FIG. 2, the amplifier circuit 22 is coupled in series with the signal line. The amplifier circuit 22 is configured to amplify the signal that has passed through the high-pass filter 21. The amplifier circuit 22 is configured to output the amplified signal to the capacitor 23.

As illustrated in FIG. 2, the capacitor 23 is disposed between the amplifier circuit 22 and the A/D conversion circuit 24. In an exemplary aspect, the capacitor 23 is a DC cut capacitor that removes a DC component included in a signal. The capacitor 23 has a capacitance value Cc23.

As illustrated in FIG. 2, the A/D conversion circuit 24 is disposed between the capacitor 23 and the MPU 3. The A/D conversion circuit 24 is configured to convert the analog signal output from the capacitor 23 into a digital signal (performs A/D conversion).

The reference voltage generation circuit 25 is configured to generate a reference voltage PV. As illustrated in FIG. 2, the reference voltage generation circuit 25 is electrically coupled to the piezoelectric sensor 1 and the high-pass filter 21.

In the exemplary aspect, the MPU 3 is configured to perform various processing by, for example, reading out a program stored in a storage device (not illustrated) to a work memory (not illustrated). For purposes of this disclosure and according to an exemplary aspect, the various processing includes processing of determining a press operation on the touch panel display by a user. The MPU 3 is electrically coupled to the A/D conversion circuit 24. In operation, the MPU 3 receives an AD-converted signal from the A/D conversion circuit 24 and determines that a user has press-operated the touch panel display when, for example, a value of a signal equal to or higher than a preset threshold value (e.g., stored in a storage device or the like) is detected. The MPU 3 may be, for example, a central processing unit (CPU) in an exemplary aspect.

Figure 1A:
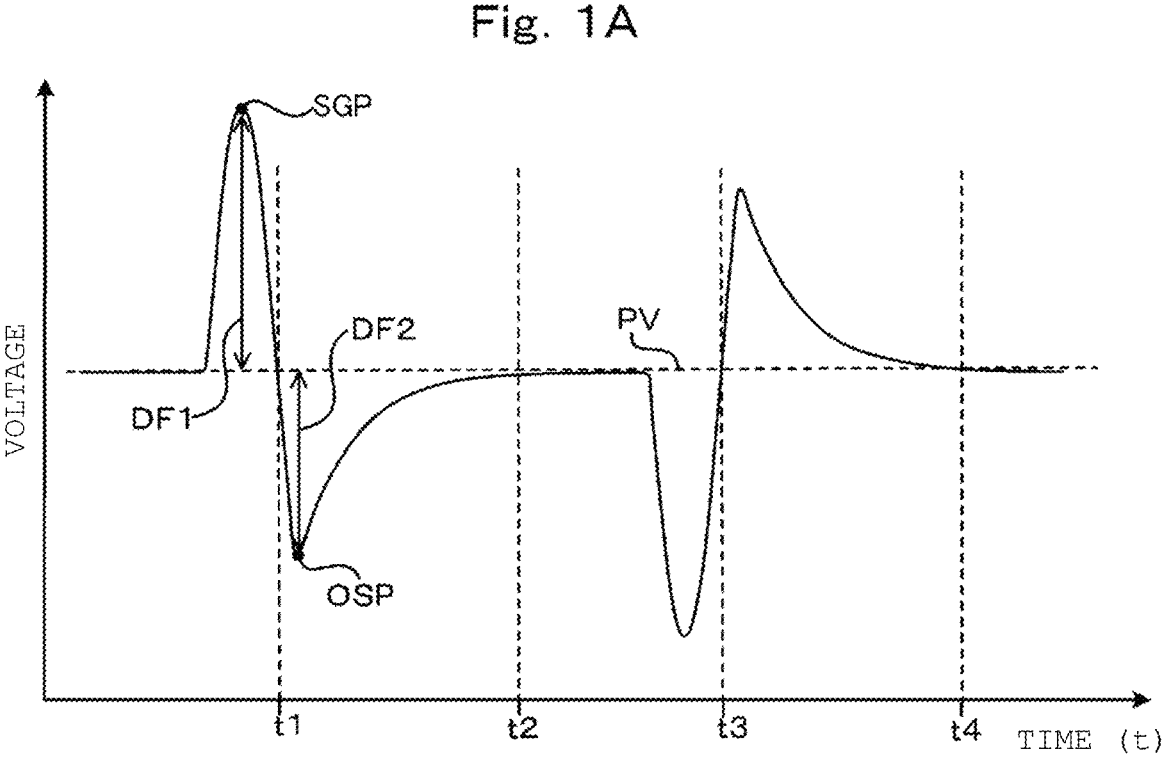
FIG. 1A is a diagram illustrating a time domain waveform (voltage waveform) of an input signal after passing through a high-pass filter.
Figure 6:
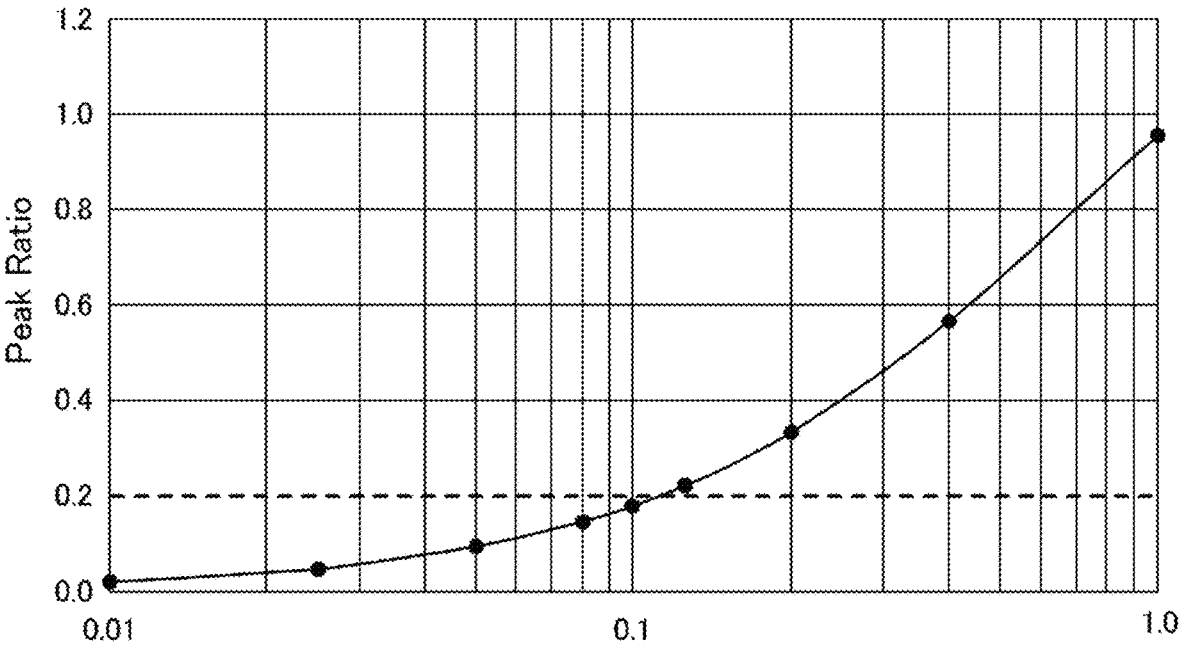
FIG. 6 is a diagram illustrating a relationship between a ratio of a cutoff frequency fc to a frequency of a signal and a ratio of a peak voltage OSP of an overshoot to a peak voltage SGP of the signal.

The signal processing circuit 2 according to the present embodiment is configured to reduce an overshoot generated in a signal (e.g., an overshoot as illustrated in FIG. 1A). Hereinafter, detailed description will be made with reference to the drawings. FIG. 6 is a diagram illustrating a relationship between a ratio of the cutoff frequency fc to a frequency of a signal and a ratio of a peak voltage OSP of an overshoot to a peak voltage SGP of the signal. In FIG. 6, the horizontal axis represents the ratio of the cutoff frequency fc to the frequency of a signal. In FIG. 6, the vertical axis represents the ratio of the peak voltage OSP of an overshoot to the peak voltage SGP of the signal.

Figure 1B:
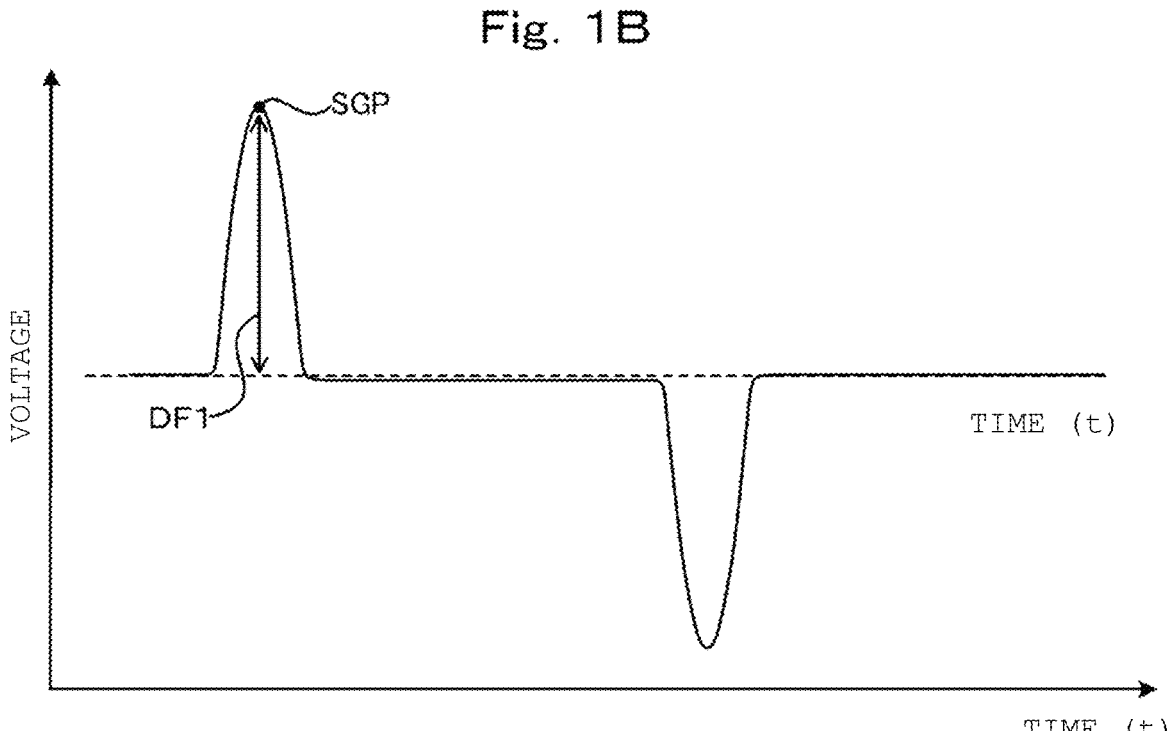
FIG. 1B is a diagram illustrating a time domain waveform (voltage waveform) of an input signal before passing through the high-pass filter.

In the present embodiment, the peak voltage SGP of a signal is defined as "a voltage when a difference DF1 between a voltage (signal) output from the piezoelectric sensor 1 and the reference voltage PV is largest" (see FIGS. 1A and 1B). The peak voltage OSP of an overshoot is defined as "a voltage when a difference DF2 between a voltage (signal) and the reference voltage PV is largest in an overshoot".

FIG. 1B illustrates an example of a signal input to the high-pass filter 21. When signal processing is performed on such a signal by the high-pass filter 21, an overshoot as illustrated in FIG. 1A may be generated. In this case, the peak voltage OSP of the overshoot may be equal to or higher than a predetermined threshold value (a threshold value used to determine the press operation in the MPU 3). As a result, due to an overshoot, the MPU 3 may erroneously determine that a user performs a press operation when the press operation by a user is not performed.

Based on the above situation, the inventor of the present application has studied the cause of the overshoot and determined that "an overshoot changes depending on the relationship between the cutoff frequency fc of the high-pass filter 21 and the frequency of the input signal". The high-pass filter 21 removes spectral components at frequencies lower than the cutoff frequency fc. Therefore, the waveform of a signal on the time axis is deformed. In this aspect, in the signal having a peak component on the time axis, the spectral components are distributed over a frequency band lower than the fundamental frequency. When the cutoff frequency fc is increased, the number of low-frequency components to be removed increases. Therefore, the waveform of a signal on the time axis is significantly deformed. As a result, the peak voltage OSP of an overshoot increases.

Given this factor, exemplary aspects of the present disclosure provide that: it would be sufficient that the cutoff frequency fc be lowered to an extent that erroneous determination by the MPU 3 can be avoided. The inventor of the present application has obtained, through conducting experiments, a result that erroneous determination by the MPU 3 can be avoided if "the ratio of the peak voltage OSP of an overshoot to the peak voltage SGP of a signal is 0.2 or less". In addition, the inventor of the present application has obtained, through experiments, a result that "the peak voltage of an overshoot is 0.2 or less with respect to the peak voltage of a signal" when the following condition is satisfied: "the ratio of the cutoff frequency fc to the frequency of the peak component of a signal is $1/10$ or less" (hereinafter, this condition is referred to as a condition A; see FIG. 6). In the high-pass filter 21, the cutoff frequency fc is "fc=$1/(2\pi \times Rc \times Cc1)$". Therefore, the an approach is provided in the present disclosure for lowering the cutoff frequency fc by increasing the resistance value Rc.

Figure 7:
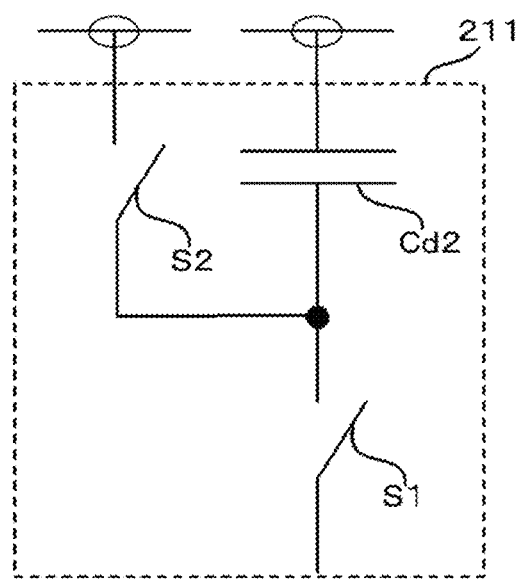
FIG. 7 is a diagram illustrating a variable resistance circuit 211.

In view of the above, the exemplary aspects of the present disclosure provide a practical operation time for a sensor while reducing an overshoot by making the resistance value Rc variable. Hereinafter, detailed description will be made with reference to the drawings. FIG. 7 is a diagram illustrating the variable resistance circuit 211.

In the present embodiment, as illustrated in FIG. 7, the variable resistance circuit 211 is a switched capacitor including switches S1 and S2 and a capacitor Cd2. For purposes of this disclosure, both the switch S1 and the switch S2 correspond to the first switch. The capacitor Cd2 is coupled in parallel with a signal line and has a capacitance value Cc2. The switch S1 is disposed between the signal line and the capacitor Cd2. The switch S2 is coupled in parallel with the capacitor Cd2.

The resistance value Rc of the variable resistance circuit 211 is an equivalent resistance value of the switched capacitor determined based on a switching frequency fs used for switching the switches S1 and S2. Specifically, an equivalent resistance value Rc of the switched capacitor is "Rc=$1/(fs \times Cc2)$". Therefore, as the switching frequency fs increases, the equivalent resistance value Rc of the switched capacitor decreases. Switching between ON and OFF of the switches S1 and S2 is performed by, for example, a processing device (not illustrated) such as a central processing unit (CPU).

According to the exemplary aspect, the variable resistance circuit 211 increases the resistance value Rc (decreases the switching frequency fs) when the high-pass filter 21 allows a target signal to pass therethrough. Specifically, the variable resistance circuit 211 increases the resistance value Rc (first resistance value) so that the cutoff frequency fc of the high-pass filter 21 with respect to the frequency of the peak component on the time axis of the signal is $\frac{1}{10}$ or less (i.e., so as to satisfy the condition A). In this case, as illustrated in FIG. 6, the ratio of the peak voltage OSP of an overshoot to the peak voltage SGP of the signal is 0.2 or less. This configuration reduces a possibility that the MPU 3 erroneously determines, due to the overshoot, that a user performs a press operation when the press operation by a user is not performed.

According to an exemplary aspect, a required waiting time until the high-pass filter 21 can execute a desired operation after the activation of the sensor system SS1 is about a time constant τ. Specifically, in order for the circuit of the sensor system SS1 to perform a desired operation, the capacitor Cd1 needs to be charged so as to reach or nearly reach a charge amount determined by the DC voltage biased to both ends of the capacitor Cd1 and the capacitance of the capacitor Cd1. To achieve this state, the sensor system SS1 requires a waiting time of about "time constant τ=Rc×Cc" after the activation of the sensor system SS1. In other words, the waiting time at the time of use can be reduced by reducing the time constant τ.

For example, in the present embodiment, the capacitance value Cc1 of the capacitor Cd1 is 0.1 μF, and the capacitance value Cc2 of the capacitor Cd2 is 6.5 pF. The switching frequency fs of the switched capacitor is, for example, 5 kHz. In this case, the cutoff frequency fc in the high-pass filter 21 is about 0.05 Hz. Therefore, the cutoff frequency fc is $\frac{1}{10}$ or less with respect to the frequency of the input signal: 1 Hz. According to an exemplary aspect, the time constant τ of the high-pass filter 21 is expressed as "$\tau=1/(2\pi \times fc)$". Accordingly, when the cutoff frequency fc in the high-pass filter 21 is 0.05 Hz, the time constant τ is about 3 sec. That is, a user needs to wait for at least about 3 sec in order to use the sensor system SS1 that performs a desired operation. For this reason, the user may develop a feeling of strangeness when using the sensor system SS1.

In view of this situation, the variable resistance circuit 211 is configured to set the resistance value Rc to a second resistance value lower than a first resistance value (increases the switching frequency fs) except when the target signal is allowed to pass through the high-pass filter 21 (except when the signal is processed). Examples of situations "except when the target signal is allowed to pass through" include timing at which a user powers on an electronic device such as a smartphone (when the sensor system SS1 is activated). With this configuration, the time constant τ of the high-pass filter 21 decreases compared to the time constant τ when the high-pass filter 21 allows the target signal to pass therethrough.

For example, when the switching frequency fs of the switched capacitor is 500 kHz, which is 100 times 5 kHz described above, the time constant τ is about 30 msec, which is $\frac{1}{100}$ of about 3 sec described above. Therefore, the time required for a user to use the sensor system SS1 after activation is about 30 msec. This 30 msec is a short time and is nearly imperceptible for a person. Therefore, a user is less likely to develop a feeling of strangeness. That is, the signal processing circuit 2 according to the present embodiment provides a practical operation for the sensor system SS1.

The variable resistance circuit 211 may have any configuration as long as the resistance value Rc can be changed. For example, the variable resistance circuit 211 may be a variable resistor.

It is noted that the piezoelectric sensor 1 is not necessarily a pressing sensor in alternative exemplary aspects.

In the example illustrated in FIGS. 1A and 1B, the signal input to the signal processing circuit 2 has a single waveform. However, the signal processing circuit 2 may receive a signal having a burst waveform and including two or more consecutive waves. In this case, the signal processing circuit 2 is configured to reduce an overshoot generated in the input signal having a burst waveform.

The high-pass filter 21 can be configured to process signals having a plurality of frequencies. In this case, it is sufficient that the cutoff frequency fc be $\frac{1}{10}$ or less of the lowest frequency among the plurality of frequencies included in the signal. Examples of the case in which the signal has a plurality of frequencies include a case in which the sensor system SS1 includes a plurality of piezoelectric sensors 1, or a case in which the speed at which the piezoelectric sensor 1 is displaced in shape changes by changing the speed at which a user presses the touch panel display.

A signal input to the high-pass filter 21 illustrated in FIG. 1B is an example. Therefore, the signal input to the high-pass filter 21 is not necessarily the same as the signal illustrated in FIG. 1B.

First Modification

Figure 8:
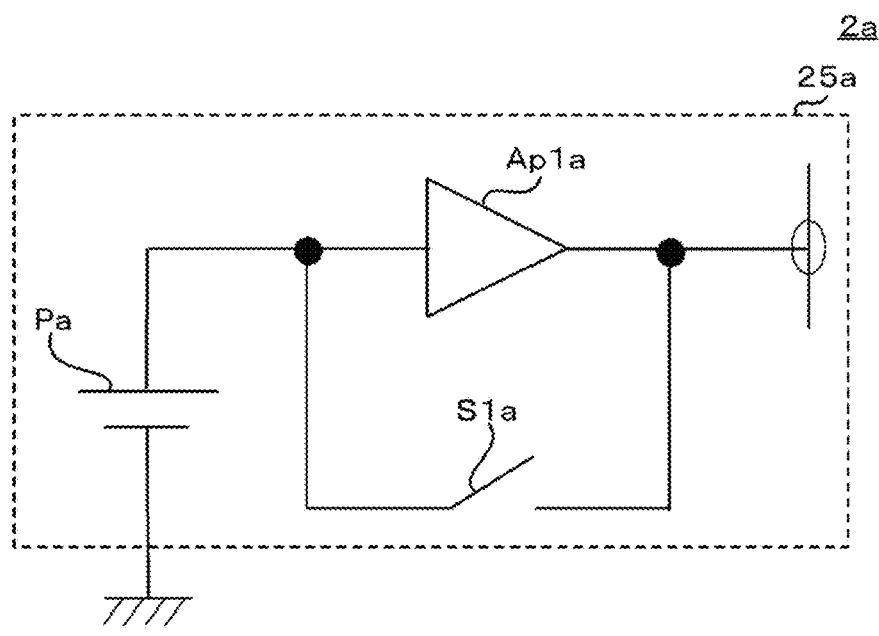
FIG. 8 is a diagram illustrating a reference voltage generation circuit 25a included in a signal processing circuit 2a according to a first modification.

Hereinafter, a signal processing circuit 2a according to a first modification of an exemplary aspect will be described with reference to the drawings. FIG. 8 is a diagram illustrating a reference voltage generation circuit 25a included in the signal processing circuit 2a according to a first modification.

In the present modification, the signal processing circuit 2a includes the reference voltage generation circuit 25a instead of the reference voltage generation circuit 25. As illustrated in FIG. 8, the reference voltage generation circuit 25a includes a reference voltage source Pa, a buffer amplifier Ap1a, and a switch S1a (e.g., a second switch). The reference voltage source Pa is configured to generate a reference voltage. The buffer amplifier Ap1a is disposed between the output of the reference voltage source Pa and the circuit that supplies the reference voltage. For example, the buffer amplifier Ap1a is coupled in series with the variable resistance circuit 211 and the reference voltage source Pa. The switch S1a is coupled in parallel with the buffer amplifier Ap1a. The buffer amplifier Ap1 increases a current supplied from the reference voltage source Pa.

As the switching frequency fs increases, the speed of charging the capacitor Cd2 increases. At this time, the charging speed of the capacitor Cd2 may exceed the ability of the reference voltage source Pa to supply a current. In this case, there is a possibility that the capacitor Cd2 cannot be charged in the target charging time (e.g., 30 msec). That is, realization of practical operations for the sensor system SS1 may be difficult. Given this factor, when the resistance value Rc of the variable resistance circuit 211 is set to the second resistance value, the buffer amplifier Ap1 is set to ON, and the switch S1a is turned off. This configuration increases a current supplied from the reference voltage source Pa and reduces the possibility that the charging speed of the capacitor Cd2 exceeds the ability of the reference voltage source Pa to supply a current.

On the other hand, when the resistance value Rc of the variable resistance circuit 211 is set to the first resistance value (when the switching frequency fs is low), the buffer amplifier Ap1a is set to OFF, and the switch S1a is set to ON. That is, when a current input to the capacitor Cd2 is not necessarily increased, the buffer amplifier Ap1a is set to OFF. This configuration can prevent unnecessary power consumption in the buffer amplifier Ap1a.

It is noted that the circuit configuration of the reference voltage generation circuit 25a illustrated in FIG. 8 is an example. Therefore, the circuit configuration of the reference voltage generation circuit 25a is not necessarily the circuit configuration illustrated in FIG. 8.

Second Modification

Figure 9:
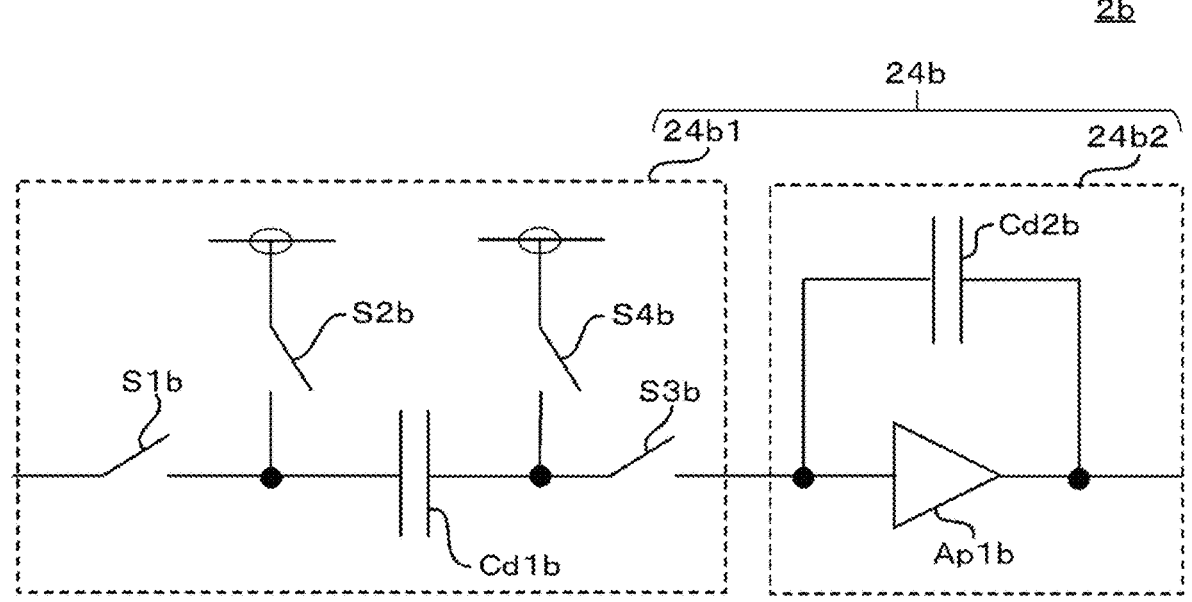
FIG. 9 is a diagram illustrating an A/D conversion circuit 24b included in a signal processing circuit 2b according to a second modification.

Hereinafter, a signal processing circuit 2b according to a second modification of an exemplary aspect will be described with reference to the drawings. FIG. 9 is a diagram illustrating an A/D conversion circuit 24b included in the signal processing circuit 2b according to a second modification.

In the present modification, the signal processing circuit 2b includes the A/D conversion circuit 24b instead of the A/D conversion circuit 24. As illustrated in FIG. 9, the A/D conversion circuit 24b includes a sample-and-hold circuit 24b1 and an integrator circuit 24b2.

The sample-and-hold circuit 24b1 is disposed on the input side of the integrator circuit 24b2. In the present modification, the sample-and-hold circuit 24b1 is a switched capacitor including switches S1b, S2b, S3b, and S4b and a capacitor Cd1b (hereinafter, such a switched capacitor is referred to as the switched capacitor according to the second modification). The switches S1b and S3b are coupled in series with the signal line. The switches S2b and S4b are coupled in parallel with the signal line. The switches S1b and S2b are disposed on the input side of the capacitor Cd1b. The switches S3b and S4b are disposed on the output side of the capacitor Cd1b. The capacitor Cd1b is disposed between the switch S1b and the switch S3b. The capacitor Cd1b has a capacitance value Ccb.

The sample-and-hold circuit 24b1 is configured to sample and hold a signal by switching the switches S1b, S2b, S3b, and S4b. Specifically, the sample-and-hold circuit 24b1 turns on the switches S1b and S4b and turns off the switches S2b and S3b. In this way, the sample-and-hold circuit 24b1 charges the capacitor Cd1b and performs sampling and holding. The sample-and-hold circuit 24b1 then turns off the switches S1b and S4b and turns on the switches S2b and S3b. In this way, the sampled and held signal is output to the integrator circuit 24b2. Switching between ON and OFF of the switches S1b, S2b, S3b, and S4b is performed based on a switching frequency fsb.

According to the exemplary aspect, the sample-and-hold circuit 24b1 configured as described above is equivalent to a coupling of a signal line on the output side of the capacitor 23 illustrated in FIG. 2 in parallel with the reference voltage via a resistor. That is, the sample-and-hold circuit 24b1 is equivalent to the variable resistance circuit in the present disclosure, and the sample-and-hold circuit 24b1 and the capacitor 23 form a high-pass filter (hereinafter, referred to as the high-pass filter according to the second modification). At this time, a resistance value Rb of the high-pass filter according to the second modification is an equivalent resistance value of the switched capacitor. This equivalent resistance value is determined based on the switching frequency fsb used for switching the switches S1b, S2b, S3b, and S4b and the capacitance value Ccb of the capacitor Cd1b (hereinafter, such a switched capacitor is referred to as the switched capacitor according to the second modification). Specifically, the resistance value Rb is "Rb=1/(fsb×Ccb)".

The high-pass filter according to the second modification is configured to allow or pass a signal having a cutoff frequency fcb or more therethrough. The cutoff frequency fcb is determined by the equivalent resistance value Rb of the switched capacitor according to the second modification and the capacitance value Ccb of the capacitor Cd1b. Specifically, the cutoff frequency fcb is expressed as "fcb=1/(2π×Rb×Ccb)". In this case, similarly to the high-pass filter 21, the waveform of the signal on the time axis is greatly deformed by the high-pass filter according to the second modification. As a result, the peak voltage OSP of an overshoot increases. Given this factor, when the high-pass filter according to the second modification allows the target signal to pass therethrough, the resistance value Rb is set such that the cutoff frequency fcb with respect to the frequency of the signal is 1/10 or less. For example, in the present modification, the capacitance value Cc23 of the capacitor 23 is 0.082 pF, and the capacitance value Ccb of the capacitor Cd1b is 3.5 pF. The switching frequency fsb of the switched capacitor according to the second modification is, for example, about 5 kHz. At this time, the cutoff frequency fcb of the high-pass filter according to second modification is about 0.034 Hz, which is 1/10 or less with respect to the frequency of the input signal: 1 Hz. Therefore, the ratio of the peak voltage OSP of an overshoot to the peak voltage SGP of the signal is 0.2 or less (see FIG. 6). With this configuration, the signal processing circuit 2b can reduce the possibility that the MPU 3 performs erroneous determination, similarly to the signal processing circuit 2 according to the first embodiment.

According to an exemplary aspect, a time constant τb of the high-pass filter according to the second modification is expressed as "τb=1/(2π×fcb)" and is about 4.7 sec. Therefore, a user may develop a feeling of strangeness when the sensor system SS1 is activated, similarly to the signal processing circuit 2 according to the first embodiment.

Therefore, except when the target signal is allowed to pass through, the signal processing circuit 2b sets the switching frequency fsb higher than that when the target signal is allowed to pass through. For example, the signal processing circuit 2b sets the switching frequency fsb to 500 kHz, which is about 100 times 5 kHz described above. In this case, the time constant τb is about 47 msec, which is 1/100 of 4.7 sec. This 47 msec is a short time and is nearly imperceptible for a person. Therefore, a user is less likely to develop a feeling of strangeness. That is, the signal processing circuit 2b according to the second modification can provide a practical operation for the sensor system SS1.

The integrator circuit 24b2 includes an amplifier Ap1b and a capacitor Cd2b. In the integrator circuit 24b2, the amplifier Ap1b is disposed between the switch S3b and the MPU 3. The capacitor Cd2b is coupled in parallel with the amplifier Ap1b. The amplifier Ap1b and the capacitor Cd2b integrate the signal input to the integrator circuit 24b2.

The circuit configuration of the A/D conversion circuit 24b illustrated in FIG. 9 is an example. Therefore, the circuit configuration of the A/D conversion circuit 24b is not necessarily the circuit configuration illustrated in FIG. 9.

Third Modification

Figure 10:
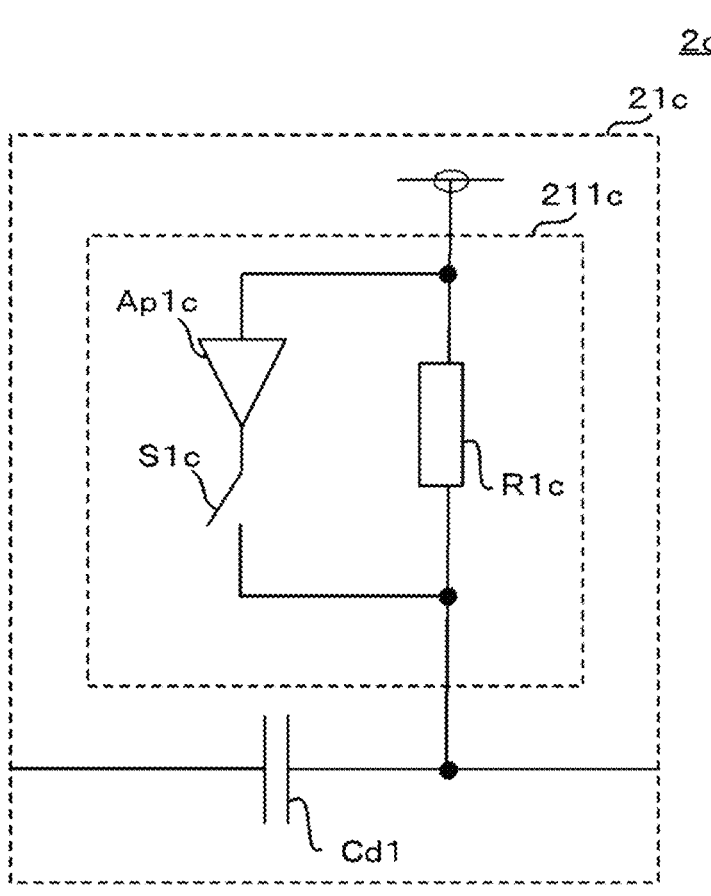
FIG. 10 is a diagram illustrating a high-pass filter 21c included in a signal processing circuit 2c according to a third modification.

Hereinafter, a signal processing circuit 2c according to a third modification according to an exemplary aspect will be described with reference to the drawings. FIG. 10 is a diagram illustrating a high-pass filter 21c included in the signal processing circuit 2c according to a third modification.

As illustrated in FIG. 10, the signal processing circuit 2c includes the high-pass filter 21c instead of the high-pass filter 21. The high-pass filter 21c includes a variable resistance circuit 211c instead of the variable resistance circuit 211.

The variable resistance circuit 211c includes a switch S1c, a buffer amplifier Ap1c, and a fixed resistor R1c. The fixed resistor R1c is coupled in parallel with the signal line. The switch S1c (e.g., a third switch) and the buffer amplifier Ap1c are coupled in parallel with the fixed resistor R1c. The buffer amplifier Ap1c is coupled in series with the switch S1c. The fixed resistor R1c may be a variable resistor, a switched capacitor, or the like according to various exemplary aspects.

In the present modification, the variable resistance circuit 211c is configured to turn off the switch S1c when the high-pass filter 21c allows the target signal to pass therethrough. In this case, a resistance value Rcc of the variable resistance circuit 211c is determined by the resistance value (e.g., a first resistance value) of the fixed resistor R1c. In the present modification, the resistance value of the fixed resistor R1c is a value that satisfies the condition A (resistance value when the cutoff frequency of the high-pass filter 21c with respect to the frequency of a signal is $1/10$ or less). Accordingly, as illustrated in FIG. 6, the ratio of the peak voltage OSP of an overshoot to the peak voltage SGP of the signal is 0.2 or less. Therefore, the possibility that the MPU 3 performs erroneous determination is reduced similarly to the signal processing circuit 2.

On the other hand, the high-pass filter 21c turns on the switch S1c and sets the buffer amplifier Ap1c to ON except when the target signal is allowed to pass through. With this setting, the fixed resistor R1c is bypassed. In this case, the high-pass filter 21c changes the resistance value Rcc from a value mainly determined by the resistance value of the fixed resistor R1c (e.g., a first resistance value) to a value determined by the actual resistance value of the entire circuit including the buffer amplifier Ap1c and the wiring (e.g., a second resistance value). The actual resistance value of the entire circuit including the buffer amplifier Ap1c and the wiring is lower than the resistance value of the fixed resistor R1c. Therefore, the time required to charge the capacitor Cd2 is shorter than that in the case in which the switch S1c is turned off. That is, the signal processing circuit 2c is configured to provide a practical operation for the sensor system SS1, similarly to the signal processing circuit 2.

The buffer amplifier Ap1c is set to OFF when the switch S1c is in OFF state (when the resistance value Rcc is set to the first resistance value). This configuration prevents unnecessary power consumption in the buffer amplifier Ap1c.

It is noted that the variable resistance circuit 211c may not include the buffer amplifier Ap1c when the current supply amount of the reference voltage source is sufficient to achieve a target time constant (e.g., 100 msec).

Moreover, the variable resistance circuit 211c may include a variable resistor or a switched capacitor that can change the resistance value instead of the fixed resistor R1c. Also in this case, the signal processing circuit 2c has the same effect as the case of including the fixed resistor R1c.

It is sufficient that the variable resistance circuits 211 and 211c set the resistance value to the second resistance value lower than the first resistance value at any timing except when the target signal is allowed to pass through. Therefore, the variable resistance circuits 211 and 211c may remain at the first resistance value at a time except when the target signal is allowed to pass through.

The variable resistance circuits 211 and 211c may set the resistance value to the second resistance value lower than the first resistance value at all times except when the target signal is allowed to pass through.

It should be appreciated that the configurations of the signal processing circuits 2 and 2a to 2c may be combined in any way.

According to exemplary aspects, the present disclosure provides the following structures.

(1) A signal processing circuit including a capacitor coupled in series to a signal line to be coupled to a sensor; and a variable resistance circuit coupled in parallel with the signal line, in which the variable resistance circuit and the capacitor form a high-pass filter that allows a signal having a cutoff frequency or higher to pass through the high-pass filter, and in the variable resistance circuit, a resistance value is set to a first resistance value when a target signal having a peak component on a time axis is allowed to pass through the high-pass filter, and the cutoff frequency at the first resistance value is $1/10$ or less of a frequency of the peak component.

(2) The signal processing circuit according to (1), in which the resistance value of the variable resistance circuit is set to a second resistance value lower than the first resistance value at any time when the target signal does not pass through the high-pass filter.

(3) The signal processing circuit according to (1), in which the resistance value of the variable resistance circuit is set to a second resistance value lower than the first resistance value at all times except when the target signal is allowed to pass through the high-pass filter.

(4) The signal processing circuit according to (2) or (3), in which the variable resistance circuit includes a switched capacitor including a capacitor, and a first switch, and the variable resistance circuit configured to change the first resistance value to the second resistance value by increasing a switching frequency of the first switch.

(5) The signal processing circuit according to (2) or (3), in which the variable resistance circuit is a variable resistor.

(6) The signal processing circuit according to (4) or (5), further including a buffer amplifier coupled in series with the variable resistance circuit and a reference voltage source; and a second switch coupled in parallel with the buffer amplifier, in which the buffer amplifier is set to OFF when the resistance value is set to the first resistance value, and ON when the resistance value is set to the second resistance value, and the second switch is set to ON when the resistance value is set to the first resistance value, and OFF when the resistance value is set to the second resistance value.

(7) The signal processing circuit according to (2) or (3), in which the variable resistance circuit includes a resistor, and a third switch coupled in parallel with the resistor, and the first resistance value is changed to the second resistance value by turning on the third switch.

(8) The signal processing circuit according to (7), in which the variable resistance circuit further includes a buffer amplifier coupled in series with the third switch, and the buffer amplifier is set to OFF when the resistance value is set to the first resistance value, and ON when the resistance value is set to the second resistance value.

(9) The signal processing circuit according to any one of (1) to (8), further including a charge-voltage conversion circuit configured to convert a charge of the sensor into a voltage; and an amplifier circuit configured to amplify the signal, in which the capacitor and the variable resistance circuit are disposed between the charge-voltage conversion circuit and the amplifier circuit.

(10) The signal processing circuit according to any one of (1) to (8), further including an amplifier circuit configured to amplify the signal; and an A/D conversion circuit including an integrator circuit configured to perform A/D conversion on the signal, in which the variable resistance circuit is disposed on an input side of the integrator circuit.

(11) The signal processing circuit according to any one of (1) to (10), in which the sensor is a pressing sensor configured to detect a press operation.

DESCRIPTION OF REFERENCE SYMBOLS

1: Piezoelectric sensor
2, 2a, 2b, 2c: Signal processing circuit
20: Charge-voltage conversion circuit
21, 21c: High-pass filter
22: Amplifier circuit
23: Capacitor
24, 24b: A/D conversion circuit
211, 211c: Variable resistance circuit
Cd1, Cd1b, Cd2, Cd2b: Capacitor
Rb, Rc, Rcc: Resistance value
fc, fcb: Cutoff frequency
fs, fsb: Switching frequency
τ, τb: Time constant

The invention claimed is:

1. A signal processing circuit comprising:
a capacitor coupled in series to a signal line to be coupled to a sensor; and
a variable resistance circuit coupled in parallel with the signal line, the variable resistance circuit including a switched capacitor that includes a capacitor and a first switch,
wherein the variable resistance circuit and the capacitor form a high-pass filter that is configured to pass a frequency that is equal to or higher than a cutoff frequency,
wherein, in the variable resistance circuit, a resistance value is set to a first resistance value when a target signal having a peak component on a time axis is allowed to pass through the high-pass filter, and the cutoff frequency at the first resistance value is ¹⁄₁₀ or less of a frequency of the peak component, and
wherein the resistance value of the variable resistance circuit is set to a second resistance value that is lower than the first resistance value when the target signal does not pass through the high-pass filter.

2. The signal processing circuit according to claim 1, wherein the resistance value of the variable resistance circuit is set to a second resistance value that is lower than the first resistance value at all times except when the target signal is allowed to pass through the high-pass filter.

3. The signal processing circuit according to claim 2, wherein the variable resistance circuit includes a switched capacitor that includes the capacitor and the first switch.

4. The signal processing circuit according to claim 3, wherein the variable resistance circuit is configured to change the first resistance value to the second resistance value by increasing a switching frequency of the first switch.

5. The signal processing circuit according to claim 1, wherein the variable resistance circuit is configured to change the first resistance value to the second resistance value by increasing a switching frequency of the first switch.

6. The signal processing circuit according to claim 5, further comprising:
a buffer amplifier coupled in series with the variable resistance circuit and a reference voltage source; and
a second switch coupled in parallel with the buffer amplifier.

7. The signal processing circuit according to claim 6, wherein the buffer amplifier is set to:
OFF when the resistance value is set to the first resistance value, and
ON when the resistance value is set to the second resistance value.

8. The signal processing circuit according to claim 7, wherein the second switch is set to:
ON when the resistance value is set to the first resistance value, and
OFF when the resistance value is set to the second resistance value.

9. The signal processing circuit according to claim 1, wherein the variable resistance circuit is a variable resistor.

10. The signal processing circuit according to claim 9, further comprising:
a buffer amplifier coupled in series with the variable resistance circuit and a reference voltage source; and
a second switch coupled in parallel with the buffer amplifier.

11. The signal processing circuit according to claim 10, wherein the buffer amplifier is set to:
OFF when the resistance value is set to the first resistance value, and
ON when the resistance value is set to the second resistance value.

12. The signal processing circuit according to claim 11, wherein the second switch is set to:
ON when the resistance value is set to the first resistance value, and
OFF when the resistance value is set to the second resistance value.

13. The signal processing circuit according to claim 1, wherein the variable resistance circuit includes:
a resistor, and
a third switch coupled in parallel with the resistor,
wherein the first resistance value is changed to the second resistance value by turning on the third switch.

14. The signal processing circuit according to claim 1, further comprising:
a charge-voltage conversion circuit configured to convert a charge of the sensor into a voltage; and
an amplifier circuit configured to amplify the signal,
wherein the capacitor and the variable resistance circuit are disposed between the charge-voltage conversion circuit and the amplifier circuit.

15. The signal processing circuit according to claim 1, further comprising:
an amplifier circuit configured to amplify the signal; and
an A/D conversion circuit including an integrator circuit configured to perform an A/D conversion on the signal,
wherein the variable resistance circuit is disposed on an input side of the integrator circuit.

16. The signal processing circuit according to claim 1, wherein the sensor is a pressing sensor configured to detect a press operation.

17. A signal processing circuit comprising:
a capacitor coupled in series to a signal line to be coupled to a sensor; and a variable resistance circuit coupled in parallel with the signal line, wherein the variable resistance circuit and the capacitor form a high-pass filter that is configured to pass a signal having a frequency that is equal to or higher than a cutoff frequency, wherein, in the variable resistance circuit, a resistance value is set to a first resistance value when a target signal having a peak component on a time axis is allowed to pass through the high-pass filter, and the cutoff frequency at the first resistance value is $\frac{1}{10}$ or less of a frequency of the peak component, wherein the resistance value of the variable resistance circuit is set to a second resistance value that is lower than the first resistance value when the target signal does not pass through the high-pass filter, and wherein the variable resistance circuit further-includes;

a resistor, a third switch coupled in parallel with the resistor, and a buffer amplifier coupled in series with the third switch, wherein the first resistance value is changed to the second resistance value by turning on the third switch.

18. The signal processing circuit according to claim 17, wherein the buffer amplifier is set to:

OFF when the resistance value is set to the first resistance value, and

ON when the resistance value is set to the second resistance value.

\* \* \* \* \*